(12) United States Patent
Mathew

(10) Patent No.: US 8,487,039 B2
(45) Date of Patent: Jul. 16, 2013

(54) SALT RESISTANT POLYAMIDE COMPOSITIONS

(75) Inventor: Anna Kutty Mathew, Kingston (CA)

(73) Assignee: E I du Pont de Nemours and Company, Wilmington, DE (US)

( * ) Notice: Subject to any disclaimer, the term of this patent is extended or adjusted under 35 U.S.C. 154(b) by 189 days.

(21) Appl. No.: 12/961,581

(22) Filed: Dec. 7, 2010

(65) Prior Publication Data

US 2011/0144257 A1    Jun. 16, 2011

Related U.S. Application Data

(60) Provisional application No. 61/285,685, filed on Dec. 11, 2009.

(51) Int. Cl.
C08L 77/06 (2006.01)
C08G 69/02 (2006.01)
C08G 69/26 (2006.01)

(52) U.S. Cl.
USPC ........... 524/600; 524/607; 528/288; 528/332; 528/335; 528/340; 528/347; 528/363

(58) Field of Classification Search
USPC ................. 524/600, 607; 528/288, 332, 335, 528/340, 347, 363
See application file for complete search history.

(56) References Cited

U.S. PATENT DOCUMENTS

| 4,076,664 | A | | 2/1978 | Pagilagan | |
|---|---|---|---|---|---|
| 5,283,282 | A | * | 2/1994 | Hamada et al. | 525/92 B |
| 5,416,189 | A | * | 5/1995 | Vandevijver et al. | 528/347 |
| 6,841,651 | B2 | | 1/2005 | Maruo et al. | |
| 7,807,742 | B2 | * | 10/2010 | Tanaka et al. | 524/404 |
| 2002/0142179 | A1 | | 10/2002 | Nanba et al. | |
| 2005/0234180 | A1 | | 10/2005 | Ono et al. | |
| 2006/0122360 | A1 | * | 6/2006 | Tsujii et al. | 528/310 |
| 2008/0193691 | A1 | | 8/2008 | Bussi et al. | |

FOREIGN PATENT DOCUMENTS

| EP | 0 272 503 | | 6/1991 |
|---|---|---|---|
| JP | 3271325 | | 4/2002 |
| WO | WO 2007010984 | A1 * | 1/2007 |

OTHER PUBLICATIONS

International Search Report, PCT/US2010/059842, Aug. 18, 2011.

\* cited by examiner

*Primary Examiner* — Michael Pepitone

(57) ABSTRACT

Disclosed is a polyamide composition including at least one semi-aromatic copolyamide, said semi-aromatic copolyamide consisting essentially of 40 to 60 mole percent repeat units of the formula $$—C(O)(CH_2)_4C(O)NHCH_2ArCH_2NH—$$ (I)

and 40 to 60 mole percent repeat units of the formula $$—C(O)(CH_2)_4C(O)NH(CH_2)_6NH—$$ (II)

wherein Ar is a meta-substituted benzene ring. Also disclosed are molded articles including the polyamide composition.

5 Claims, No Drawings

SALT RESISTANT POLYAMIDE COMPOSITIONS

CROSS REFERENCE TO RELATED INVENTIONS

This application claims the benefit of priority of U.S. Provisional Application No. 61/285,685, filed on Dec. 11, 2009 and currently pending.

FIELD OF INVENTION

The present invention relates to the field of polyamide compositions having improved salt resistance.

BACKGROUND OF INVENTION

Polymeric materials, including thermoplastics and thermosets, are used extensively in automotive vehicles and for other purposes. They are light and relatively easy to fashion into complex parts, and are therefore preferred instead of metals in many instances. However a problem with some polymers is salt stress (induced) corrosion cracking (SSCC), where a part under stress undergoes accelerated corrosion when under stress and in contact with inorganic salts. This often results in cracking and premature failure of the part.

Polyamides such as polyamide 6,6, polyamide 6, polyamide 6,10 and polyamide 6,12 have been made into and used as vehicular parts and other types of parts. While it has been reported that polyamides 6,10 and 6,12 are more resistant to SSCC (see for instance Japanese Patent 3271325B2), all of these polyamides are prone to SSCC in such uses, because for instance, various sections of vehicles and their components are sometimes exposed to salts, for example salts such as sodium chloride or calcium chloride used to melt snow and ice in colder climates. Corrosion of metallic parts such as fittings and frame components made from steel and various iron based alloys in contact with water and road salts can also lead to formation of salts. These salts, in turn, can attack the polyamide parts making them susceptible to SSCC. Thus polyamide compositions with better resistance to SSCC are desired.

U.S. Pat. No. 4,076,664 discloses a terpolyamide resin that has favorable resistance to zinc chloride.

European patent application 0272503 discloses a molding polyamide resin comprising poly(m-xylylenesebacamide) (PA MXD10) and a crystalline polyamide having a melting point about 20-30° C. higher than that of PA MXD10.

U.S. Pat. No. 6,841,651 discloses a polyamide resin including a diamine component comprising 70 mol % or more of m-xylylene diamine and a dicarboxylic acid component comprising 70 mol % or more of a C4-C20 aliphatic dicarboxylic acid.

SUMMARY OF INVENTION

Disclosed is a polyamide composition comprising at least one semi-aromatic copolyamide, said semi-aromatic copolyamide consisting essentially of 40 to 60 mole percent repeat units of the formula

     (I)

and 40 to 60 mole percent repeat units of the formula

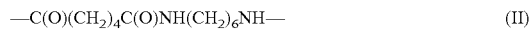     (II)

wherein Ar is a meta-substituted benzene ring.

Also disclosed is a molded article comprising the polyamide composition disclosed above.

DETAILED DESCRIPTION

Herein the term "(meth)acrylic" and "(meth)acrylate" encompass acrylic acid and methacrylic acid, and esters of acrylic acid and methacrylic acid, respectively.

Herein melting points and glass transitions are as determined with differential scanning calorimetry (DSC) at a scan rate of 10° C./min in the first heating scan, wherein the melting point is taken at the maximum of the endothermic peak and the glass transition, if evident, is considered the mid-point of the change in enthalpy.

The polyamide composition disclosed herein comprises at least one semi-aromatic copolyamide, said semi-aromatic copolyamide consisting essentially of 40 to 60 mole percent repeat units of the formula

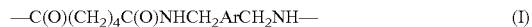     (I)

and 40 to 60 mole percent repeat units of the formula

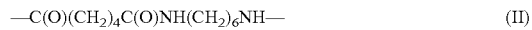     (II)

wherein Ar is a meta-substituted benzene ring. Preferably said copolyamide has a melting point equal to or less than 225° C.

Preferred copolyamides are wherein said semi-aromatic copolyamide has about 45 to about 55 mole percent repeat units of formula (1) and about 45 to about 55 mole percent repeat units of formula (II).

The semi-aromatic copolyamide is formed from polycondensation of a mixture of adipic acid, hexamethylene diamine, and meta-xylylene diamine (MXD) in the specified molar ratio disclosed above. Other aliphatic dicarboxylic acids and aliphatic diamines may be present in the semi-aromatic copolyamide, but only to the extent that they do not affect the salt resistant properties of the copolymer. For instance in one embodiment other aliphatic dicarboxylic acids and aliphatic diamines may be present at about 0.1 to 3 weight percent based on the total mole percent of diamine and/or dicarboxylic acid. Other dicarboxylic acid monomers include decanedioic acid (C10), dodecanedioic acid (C12), and tetradecanedioic acid (C14). Other aliphatic diamines include decamethylene diamine, and dodecamethylene diamine.

The following list exemplifies the abbreviations used to identify monomers and repeat units in the semi-aromatic copolyamides (PA):

| | |
|---|---|
| HMD | hexamethylene diamine (or 6 when used in combination with a diacid) |
| AA | Adipic acid |
| MXD | meta-xylylene diamine |
| MXD6 | polymer repeat unit formed from MXD and AA |
| 6,6 | polymer repeat unit formed from HMD and AA |
| 6,6/MXD6 | copolymer including 6,6 and MXD6 repeat units |

The copolyamide may be prepared by any means known to those skilled in the art, such as in a batch process using, for example, an autoclave or using a continuous process. See, for example, Kohan, M. I. Ed. *Nylon Plastics Handbook*, Hanser: Munich, 1995; pp. 13-32. Additives such as lubricants, antifoaming agents, and end-capping agents may be added to the polymerization mixture.

The polyamide composition may optionally comprise additives including additives selected from the group consisting of polymeric tougheners, plasticizers, and reinforcing agents.

The polyamide composition, optionally, comprises 0 to 50 weight percent of a polymeric toughener comprising a reactive functional group and/or a metal salt of a carboxylic acid. In one embodiment the molded or extruded thermoplastic article comprises 2 to 20 weight percent polymeric toughener selected from the group consisting of: a copolymer of ethylene, glycidyl (meth)acrylate, and optionally one or more (meth)acrylate esters; an ethylene/α-olefin or ethylene/α-olefin/diene copolymer grafted with an unsaturated carboxylic anhydride; a copolymer of ethylene, 2-isocyanatoethyl (meth)acrylate, and optionally one or more (meth)acrylate esters; and a copolymer of ethylene and (meth)acrylic acid reacted with a Zn, Li, Mg or Mn compound to form the corresponding ionomer.

The polyamide composition may optionally comprise at least one plasticizer. The plasticizer will preferably be miscible with the copolyamide. Examples of suitable plasticizers include sulfonamides, preferably aromatic sulfonamides such as benzenesulfonamides and toluenesulfonamides. Examples of suitable sulfonamides include N-alkyl benzenesulfonamides and toluenesulfonamides, such as N-butylbenzenesulfonamide, N-(2-hydroxypropyl)benzenesulfonamide, N-ethyl-o-toluenesulfonamide, N-ethyl-p-toluenesulfonamide, o-toluenesulfonamide, p-toluenesulfonamide, and the like. Preferred are N-butylbenzenesulfonamide, N-ethyl-o-toluenesulfonamide, and N-ethyl-p-toluenesulfonamide.

The plasticizer may be incorporated into the composition by melt-blending the polymer with plasticizer and, optionally, other ingredients, or during polymerization. If the plasticizer is incorporated during polymerization, the copolyamide monomers are blended with one or more plasticizers prior to starting the polymerization cycle and the blend is introduced to the polymerization reactor. Alternatively, the plasticizer can be added to the reactor during the polymerization cycle.

When used, the plasticizer will be present in the composition in about 1 to about 20 weight percent, or more preferably in about 6 to about 18 weight percent, or yet more preferably in about 8 to about 15 weight percent, wherein the weight percentages are based on the total weight of the composition.

The polyamide composition may optionally comprise 0 to about 60 weight percent, and preferably about 10 to 60 weight percent, and 15 to 50 weight percent, of one or more reinforcement agents. The reinforcement agent may be any filler, but is preferably selected from the group consisting of calcium carbonate, glass fibers with circular cross-section, glass fibers with noncircular cross-section, glass flakes, glass beads, carbon fibers, talc, mica, wollastonite, calcined clay, kaolin, diatomite, magnesium sulfate, magnesium silicate, barium sulfate, titanium dioxide, sodium aluminum carbonate, barium ferrite, potassium titanate and mixtures thereof. Glass fibers, glass flakes, talc, and mica are preferred reinforcement agents.

The polyamide composition may optionally comprise additional additives such as thermal, oxidative, and/or light stabilizers; colorants; lubricants; mold release agents; and the like. Such additives can be added according to the desired properties of the resulting material, and the control of these amounts versus the desired properties is within the knowledge of the skilled artisan.

Herein the polyamide composition is a mixture by melt-blending, in which all polymeric ingredients are adequately mixed, and all non-polymeric ingredients are adequately dispersed in a polymer matrix. Any melt-blending method may be used for mixing polymeric ingredients and non-polymeric ingredients of the present invention. For example, polymeric ingredients and non-polymeric ingredients may be fed into a melt mixer, such as single screw extruder or twin screw extruder, agitator, single screw or twin screw kneader, or Banbury mixer, and the addition step may be addition of all ingredients at once or gradual addition in batches. When the polymeric ingredient and non-polymeric ingredient are gradually added in batches, a part of the polymeric ingredients and/or non-polymeric ingredients is first added, and then is melt-mixed with the remaining polymeric ingredients and non-polymeric ingredients that are subsequently added, until an adequately mixed composition is obtained. If a reinforcing filler presents a long physical shape (for example, a long glass fiber), drawing extrusion molding may be used to prepare a reinforced composition.

In another aspect, the present invention relates to a method for manufacturing an article by shaping the polyamide composition of the invention. Examples of articles are films or laminates, automotive parts or engine parts or electrical/electronics parts. By "shaping", it is meant any shaping technique, such as for example extrusion, injection molding, thermoform molding, compression molding or blow molding. Preferably, the article is shaped by injection molding or blow molding.

The molded or extruded thermoplastic articles disclosed herein may have application in many vehicular components that meet one or more of the following requirements: high impact requirements; significant weight reduction (over conventional metals, for instance); resistance to high temperature; resistance to oil environment; resistance to chemical agents such as coolants and road salts; and noise reduction allowing more compact and integrated design. Specific molded or extruded thermoplastic articles are selected from the group consisting of charge air coolers (CAC); cylinder head covers (CHC); oil pans; engine cooling systems, including thermostat and heater housings and coolant pumps; exhaust systems including mufflers and housings for catalytic converters; air intake manifolds (AIM); and timing chain belt front covers. Other molded or extruded thermoplastic articles disclosed herein are selected from the group consisting of pipes for transporting liquids and gases, inner linings for pipes, fuel lines, air break tubes, coolant pipes, air ducts, pneumatic tubes, hydraulic houses, cable covers, cable ties, connectors, canisters, and push-pull cables.

The present invention is further illustrated by the following examples. It should be understood that the following examples are for illustration purposes only, and are not used to limit the present invention thereto.

Methods

Melting Point

Herein melting points were as determined with DSC at a scan rate of 10° C./min in the first heating scan, wherein the melting point is taken at the maximum of the endothermic peak.

Inherent Viscosity

Inherent viscosity (IV) was measured on a 0.5% solution of copolyamide in m-cresol at 25° C.

Physical Properties Measurement

Copolyamides obtained from multiple preparation batches (2 to 3 batches) were cube blended, dried and then injection molded into test bars. The tensile and flexural properties were measured as per ASTM D638 and ASTM D790 test procedures, respectively. Yield stress was measured using 115 mm (4.5 in) long and 3.2 mm (0.13 in) thick type IV tensile bars per ASTM D638-02a test procedure with a crosshead speed of 50 mm/min (2 in/min). Flexural modulus was measured using 3.2 mm (0.13 in) thick test pieces per ASTM D790 test procedure with a 50 mm (2 in) span, 5 mm (0.2 in) load and support nose radii and 1.3 mm/min (0.05 in/min) crosshead speed.

Salt Resistance Characterization

The method for stress crack resistance is based on ASTM D1693 which provides a method for determination of environmental stress-cracking, of ethylene plastics in presence of surface active agents such as soaps, oils, detergents etc. This procedure was adapted for determining salt stress cracking resistance of copolyamides to salt solutions as follows.

Rectangular test pieces measuring 50 mm×12 mm×3.2 mm were used for the test. A controlled nick was cut into the face of each molded bar as per the standard procedure, the bars were bent into U-shape with the nick facing outward, and positioned into brass specimen holders as per the standard procedure. At least five bars were used for each copolymer. The holders were positioned into large test tubes.

The test fluid used was 50 weight percent zinc chloride solution prepared by dissolving anhydrous zinc chloride into water in 50:50 weight ratio. The test tubes containing specimen holders were filled with freshly prepared salt solution fully immersing the test pieces such that there was at least 12 mm of fluid above the top test piece. The test tubes were positioned upright in a circulating air oven maintained at 50° C. Test pieces were periodically examined for development of cracks.

Materials

PA MXD6 is nylon MXD6 Grade S6011, available from Mitsubishi Gas Chemical America Inc. 655 Third Avenue, 24$^{th}$ Floor, New York, N.Y. 10017.

Example 1

This Example discloses the preparation of PA66/MXD6 (50/50 mole ratio).

A 10 L autoclave was charged with adipic acid (2093 g), meta-xylylene diamine (983 g), an aqueous solution containing 81.93 weight % of hexamethylene diamine (HMD) (1024 g), an aqueous solution containing 1 weight percent sodium hypophosphite (34 g), an aqueous solution containing 1 weight percent Carbowax 8000 (10 g), and water (2400 g).

The autoclave agitator was set to 5 rpm and the contents were purged with nitrogen at 10 psi for 10 minutes. The agitator was then set to 50 rpm, the pressure control valve was set to 1.72 MPa (250 psi), and the autoclave was heated. The pressure was allowed to rise to 1.72 MPa at which point steam was vented to maintain the pressure at 1.72 Mpa. The temperature of the contents was allowed to rise to 240° C. The pressure was then reduced to 0 psig over about 45 minutes. During this time, the temperature of the contents rose to 260° C. The autoclave pressure was reduced to 5 psia by applying vacuum and held there for 20 minutes. The autoclave was then pressurized with 65 psia nitrogen and the molten polymer was extruded into strands, quenched with cold water and cut into pellets.

The copolyamide obtained had an IV of 1.21 dl/g and a melting point of 213° C.

Comparative Example C-1

A commercial sample of PA MXD6 was used in preparation of test samples.

Comparative Example C-2 and C-3

Comparative Examples C-2 (PA 66/MXD6, 70/30) and C-3 (PA 66/MXD6, 30/70) were prepared similarly to Example 1 by adjusting the amount of HMD and MXD to achieve the desired mole ratio.

The physical testing and salt stress crack resistance properties of the Example and Comparative Examples are listed in Tables 1.

Examples 1 shows no failure after up to 168 h exposure to the ZnCl$_2$ solution; whereas Comparative Examples C-1-C-3 exhibit significant failures after 4 hours. This demonstrates that a semi-aromatic copolymer having a specific molar compositional range of repeat units has surprising and unexpected resistance to the salt stress crack resistance testing that is not found in the comparative Examples.

TABLE 1

|  | Example No. | | | |
| --- | --- | --- | --- | --- |
|  | C-1 | C-2 | 1 | C-3 |
| Composition | PA MXD6 | PA 66/ MXD6 70/30 | PA 66/ MXD6 50/50 | PA 66/ MXD6 30/70 |
| Melting point (° C.) | 240 | 232 | 213 | 210 |
| Flex Modulus (Mpa) | 4032 | 2262 | 3367 | 3056 |
| Yield Stress (Mpa) | 117 | 99 | 97 | 100 |
| ZnCl$_2$ immersion (h, observation) | 4 h, cracks in 5/5 | 4 h, cracks in 5/5 | 168 h, no failure | 4 h, cracks in 4/5 |

I claim:

1. A polyamide composition comprising at least one semi-aromatic copolyamide, said semi-aromatic copolyamide consisting essentially of 50 mole percent repeat units of the formula —C(O)(CH$_2$)$_4$C(O)NHCH$_2$ArCH$_2$NH—    (I)

and 50 mole percent repeat units of the formula

—C(O)(CH$_2$)$_4$C(O)NH(CH$_2$)$_6$NH—    (II)

wherein Ar is a meta-substituted benzene ring.

2. The polyamide composition of claim 1, further comprising one or more reinforcement agents selected from the group consisting of glass fibers with circular cross-section and glass fibers with noncircular cross-section and mixtures thereof.

3. The polyamide composition of claim 1, further comprising one or more polymeric tougheners.

4. The polyamide composition of claim 1, further comprising one or more plasticizers.

5. An article comprising the polyamide composition of claim 1.

* * * * *